United States Patent
Ergican et al.

(10) Patent No.: US 9,878,273 B2
(45) Date of Patent: Jan. 30, 2018

(54) DISPOSABLE FILTER CARTRIDGE FOR WATER DISPENSER

(71) Applicant: Apiqe Holdings, LLC, Torrance, CA (US)

(72) Inventors: Erdogan Ergican, Torrance, CA (US); Sann Myint Naing, Monterey Park, CA (US)

(73) Assignee: Apiqe Holdings, LLC, Torrance, CA (US)

(*) Notice: Subject to any disclaimer, the term of this patent is extended or adjusted under 35 U.S.C. 154(b) by 513 days.

(21) Appl. No.: 14/138,811

(22) Filed: Dec. 23, 2013

(65) Prior Publication Data
US 2014/0238920 A1 Aug. 28, 2014

Related U.S. Application Data

(63) Continuation of application No. PCT/US2012/044041, filed on Jun. 25, 2012.
(Continued)

(51) Int. Cl.
*B01D 35/30* (2006.01)
*B01D 29/15* (2006.01)
(Continued)

(52) U.S. Cl.
CPC ............. *B01D 35/30* (2013.01); *B01D 29/15* (2013.01); *B01D 29/23* (2013.01); *C02F 1/001* (2013.01);
(Continued)

(58) Field of Classification Search
CPC ........ B01D 35/30; B01D 29/23; B01D 29/15; B01D 2201/4015; B01D 2201/4076;
(Continued)

(56) References Cited

U.S. PATENT DOCUMENTS

| 1,029,236 A | 6/1912 | Shattuck et al. |
| 2,162,842 A | 6/1939 | Dolison |

(Continued)

FOREIGN PATENT DOCUMENTS

| CN | 1277594 A | 12/2000 |
| CN | 1914123 A | 2/2007 |

(Continued)

OTHER PUBLICATIONS

Chinese Office Action in CN Appl. Ser. No. 201180033123.X dated Nov. 30, 2014.
(Continued)

*Primary Examiner* — Madeline Gonzalez
(74) *Attorney, Agent, or Firm* — Foley & Lardner LLP; James De Vellis

(57) ABSTRACT

Embodiments of the technology disclosed herein include disposable filter cartridges for use with a water dispenser that dispenses hot water, flavored water, and chilled, sparkling water. An exemplary filter cartridge may be assembled by screwing or inserting a filter into filter cap until the filter cap engages a lock, such as an agnail lock, on the filter. Once engaged, the lock permanently secures the filter to the filter cap without adhesives, heat treatment, or curing. The filter cartridge includes one or more protrusions, or partial flanges, that twist into a recess formed by an injection-molded, two-piece locking assembly affixed to the water dispenser. Twisting the filter cartridge to a predetermined angle with respect to the locking assembly locks the filter cartridge into place. In some embodiments, the locking assembly and the filter cartridge audibly "click" or "snap" to indicate that they are secured together.

16 Claims, 16 Drawing Sheets

US 9,878,273 B2

Page 2

Related U.S. Application Data

(60) Provisional application No. 61/500,469, filed on Jun. 23, 2011.

(51) Int. Cl.
*B01D 29/23* (2006.01)
*C02F 1/00* (2006.01)

(52) U.S. Cl.
CPC ............... B01D 2201/302 (2013.01); B01D 2201/4015 (2013.01); B01D 2201/4076 (2013.01); C02F 2201/004 (2013.01); C02F 2201/006 (2013.01)

(58) Field of Classification Search
CPC ............... B01D 2201/302; C02F 1/001; C02F 2201/006; C02F 2201/004
USPC ........ 210/232, 443, 440, 444, DIG. 17, 450, 210/493.2
See application file for complete search history.

(56) References Cited

U.S. PATENT DOCUMENTS

| | | | |
|---|---|---|---|
| 2,173,979 A | 9/1939 | Picut | |
| 2,271,982 A | 2/1942 | Van Kreveld et al. | |
| 2,899,170 A | 8/1959 | Cornelius | |
| 2,924,238 A | 8/1960 | Corenlius | |
| 3,502,111 A | 3/1970 | Hansen | |
| 3,526,391 A | 9/1970 | Church, Jr. | |
| 3,648,984 A | 3/1972 | Mimura et al. | |
| 3,744,762 A | 7/1973 | Schlicht | |
| 3,761,066 A | 9/1973 | Wheeler | |
| 4,068,830 A | 1/1978 | Gray | |
| 4,078,578 A | 3/1978 | Buchholz | |
| 4,081,863 A | 3/1978 | Rees | |
| 4,087,862 A | 5/1978 | Tsien | |
| 4,124,309 A | 11/1978 | Yao | |
| 4,271,992 A | 6/1981 | Becker | |
| 4,695,378 A | 9/1987 | Ackman et al. | |
| 4,753,535 A | 6/1988 | King | |
| 4,783,319 A | 11/1988 | Habrich et al. | |
| 4,940,164 A | 7/1990 | Hancock et al. | |
| 4,948,505 A * | 8/1990 | Petrucci ................ | B01D 35/30 210/238 |
| 5,033,651 A | 7/1991 | Whigham et al. | |
| 5,050,806 A | 9/1991 | Anderson et al. | |
| 5,064,097 A | 11/1991 | Brog et al. | |
| 5,192,513 A | 3/1993 | Stumphauzer et al. | |
| 5,473,909 A | 12/1995 | Kateman et al. | |
| 5,510,060 A | 4/1996 | Knoll | |
| 5,538,028 A | 7/1996 | Lombardo | |
| 5,842,600 A | 12/1998 | Singleterry et al. | |
| 5,934,328 A | 8/1999 | Conrad et al. | |
| 6,041,970 A | 3/2000 | Vogel | |
| 6,060,092 A | 5/2000 | Oesterwind et al. | |
| 6,120,685 A | 9/2000 | Carlson et al. | |
| 6,253,963 B1 | 7/2001 | Tachibana | |
| 6,669,238 B1 | 12/2003 | Santy, Jr. | |
| 7,048,148 B2 | 5/2006 | Roekens et al. | |
| 7,059,591 B2 | 6/2006 | Bortkevitch et al. | |
| 7,338,551 B2 | 3/2008 | Kozyuk | |
| 7,445,133 B2 | 11/2008 | Ludovissie et al. | |
| 7,513,398 B2 | 4/2009 | Miller | |
| 7,600,911 B2 | 10/2009 | Bechtold | |
| 7,815,078 B2 | 10/2010 | Robinson | |
| 7,878,705 B2 | 2/2011 | Schauerte | |
| 7,913,984 B2 | 3/2011 | Noguchi et al. | |
| 8,091,737 B2 | 1/2012 | Smeller et al. | |
| 8,109,413 B2 | 2/2012 | Schroeder et al. | |
| 8,177,197 B1 | 5/2012 | Ergican | |
| 8,191,867 B2 | 6/2012 | Spiegel | |
| 8,499,978 B2 | 8/2013 | Dalchau et al. | |
| 8,567,767 B2 | 10/2013 | Fantappie | |
| 8,631,974 B2 | 1/2014 | Piatnik et al. | |
| 8,636,268 B2 | 1/2014 | Fantappie | |
| 8,960,500 B2 | 2/2015 | Van Opstal et al. | |
| 2001/0027809 A1 | 10/2001 | Guillaume et al. | |
| 2003/0080037 A1 | 5/2003 | Mazzei | |
| 2003/0080443 A1 | 5/2003 | Bosko | |
| 2004/0144710 A1* | 7/2004 | Bassett ................ | B01D 27/08 210/234 |
| 2004/0251566 A1 | 12/2004 | Kozyuk | |
| 2005/0161394 A1* | 7/2005 | Fritze .................... | B01D 27/08 210/435 |
| 2006/0051448 A1 | 3/2006 | Schryver et al. | |
| 2006/0056271 A1 | 3/2006 | Kapila et al. | |
| 2006/0086136 A1 | 4/2006 | Maritan et al. | |
| 2006/0138170 A1 | 6/2006 | Brim et al. | |
| 2006/0280027 A1 | 12/2006 | Fulton | |
| 2006/0288874 A1 | 12/2006 | Ziesel | |
| 2007/0070807 A1 | 3/2007 | Bracht et al. | |
| 2007/0257378 A1 | 11/2007 | Spiegel | |
| 2009/0026637 A1 | 1/2009 | Goltenboth et al. | |
| 2009/0236277 A1* | 9/2009 | Kurth .................... | C02F 9/005 210/234 |
| 2010/0024890 A1 | 2/2010 | Romanyszyn et al. | |
| 2010/0107887 A1 | 5/2010 | Bentley et al. | |
| 2010/0133708 A1 | 6/2010 | Fischer | |
| 2011/0316175 A1 | 12/2011 | Kumar et al. | |

FOREIGN PATENT DOCUMENTS

| | | |
|---|---|---|
| DE | 197 42 301 | 11/1998 |
| DE | 1020060 48 456 | 4/2008 |
| EP | 1 090 677 A1 | 4/2001 |
| EP | 1 716 918 | 11/2006 |
| EP | 2 070 586 | 6/2009 |
| EP | 2 070 587 A1 | 6/2009 |
| JP | 2001-187326 | 7/2001 |
| JP | 2001-335520 | 12/2001 |
| JP | 2005-288052 | 10/2005 |
| JP | 2007-089710 | 4/2007 |
| JP | 2008-289990 | 12/2008 |
| KR | 10-2005-0095340 | 9/2005 |
| KR | 10-2006-0003947 | 1/2006 |
| KR | 10-2006-0102726 | 9/2006 |
| KR | 10-0634782 | 10/2006 |
| KR | 10-2008-0101047 | 11/2008 |
| KR | 10-0900275 | 5/2009 |
| TW | 200827291 | 7/2008 |
| WO | WO-99/21798 | 5/1999 |
| WO | WO-00/07707 | 2/2000 |
| WO | WO-00/25904 A1 | 5/2000 |
| WO | WO-2005/075365 | 8/2005 |
| WO | WO-2006/044346 | 4/2006 |
| WO | WO-2007/028390 | 3/2007 |
| WO | WO-2008/120076 | 10/2008 |

OTHER PUBLICATIONS

European Search Report on EP Appl. Ser. No. 12802311.6 dated Nov. 13, 2014 (APQ-0002EP).
International Preliminary Report on Patentability for PCT Appl. Ser. No. PCT/US2011/033709 dated Nov. 6, 2012.
International Preliminary Report on Patentability for PCT Appl. Ser. No. PCT/US2012/043708 dated Dec. 23, 2013 (APQ-002PCT).
International Preliminary Report on Patentability for PCT Appl. Ser. No. PCT/US2012/043797 dated Dec. 23, 2013 (APQ-0001PCT).
International Preliminary Report on Patentability for PCT Appl. Ser. No. PCT/US2012/043873 dated Dec. 23, 2013 (APQ-0004PCT).
International Preliminary Report on Patentability for PCT Appl. Ser. No. PCT/US2012/044041 dated Dec. 23, 2014 (APQ-0003PCT).
International Search Report for PCT Appl. Ser. No. PCT/US2011/ 033709 dated Oct. 21, 2011.
International Search Report for PCT Appl. Ser. No. PCT/US2012/ 043708 dated Jan. 28, 2013 (APQ-002PCT).
International Search Report for PCT Appl. Ser. No. PCT/US2012/ 043797 dated Nov. 26, 2012 (APQ-0001PCT).
International Search Report for PCT Appl. Ser. No. PCT/US2012/ 044041 dated Jan. 25, 2013 (APQ-0003PCT).

(56) References Cited

OTHER PUBLICATIONS

Office Action in Mexican Appl. Ser. No. MX/a/2012/012838 dated Dec. 8, 2014.
Office Action in Mexican Patent Appl. Ser. No. MX/a/2012/012838 dated Apr. 22, 2014.
US Notice of Allowance in U.S. Appl. No. 12/772,641 dated Aug. 16, 2013 (20559/3).
US Notice of Allowance in U.S. Appl. No. 13/780,977 dated Oct. 16, 2013.
US Office Action in U.S. Appl. No. 12/772,641 dated Nov. 29, 2012 (20559/3).
US Office Action in U.S. Appl. No. 12/772,641 dated Jun. 4, 2012 (20559/3).
US Office Action in U.S. Appl. No. 13/780,977 dated Jun. 4, 2013.
Chinese Office Action in CN Appl. Ser. No. 201180033123.X dated Mar. 6, 2015.
Chinese Office Action in CN Appl. Ser. No. 201180033123.X dated Oct. 29, 2015.
European Search Report in Application No. 12802533.5, dated Jul. 21, 2015.
European Search Report received in EP Appl. No. 12802311.6 dated Mar. 17, 2016.
IL Office Action in IL Appl. No. 222838, dated Jul. 21, 2015.
Japanese Office Action in JP Appl. Ser. No. 2013-509106 dated Mar. 16, 2015.
Office Action and Search Report for Taiwan Appl. Ser. No. 100114244 dated Feb. 5, 2016.
Office Action in U.S. Appl. No. 14/138,831 dated Aug. 27, 2015.
U.S. Notice of Allowance in U.S. Appl. No. 14/138,712, dated Dec. 4, 2015.
U.S. Office Action in U.S. Appl. No. 14/138,831, dated Jan. 12, 2016.
U.S. Office Action in U.S. Appl. No. 14,138,817, dated Oct. 15, 2015.
U.S. Office Action in U.S. Appl. No. 14/138,712, dated Aug. 13, 2015.
U.S. Office Action in U.S. Appl. No. 14/162,343, dated Oct. 30, 2015.
U.S. Office Action in U.S. Appl. No. 14/138,817 dated Mar. 26, 2015.
U.S. Office Action received in U.S. Appl. No. 14/138,831, dated Jun. 24, 2016.
CA Office Action in Appl. No. 2,834,977 dated May 5, 2017.
Extended EP Search Report in EP Appl. No. 11777860.5 dated Jul. 7, 2017.
KR Office Action in KR Appl. 10-2012-7031660 dated Apr. 13, 2017.
US Notice of Allowance in U.S. Appl. No. 14/138,831 dated Jan. 5, 2017.

\* cited by examiner

Locking Assembly
250

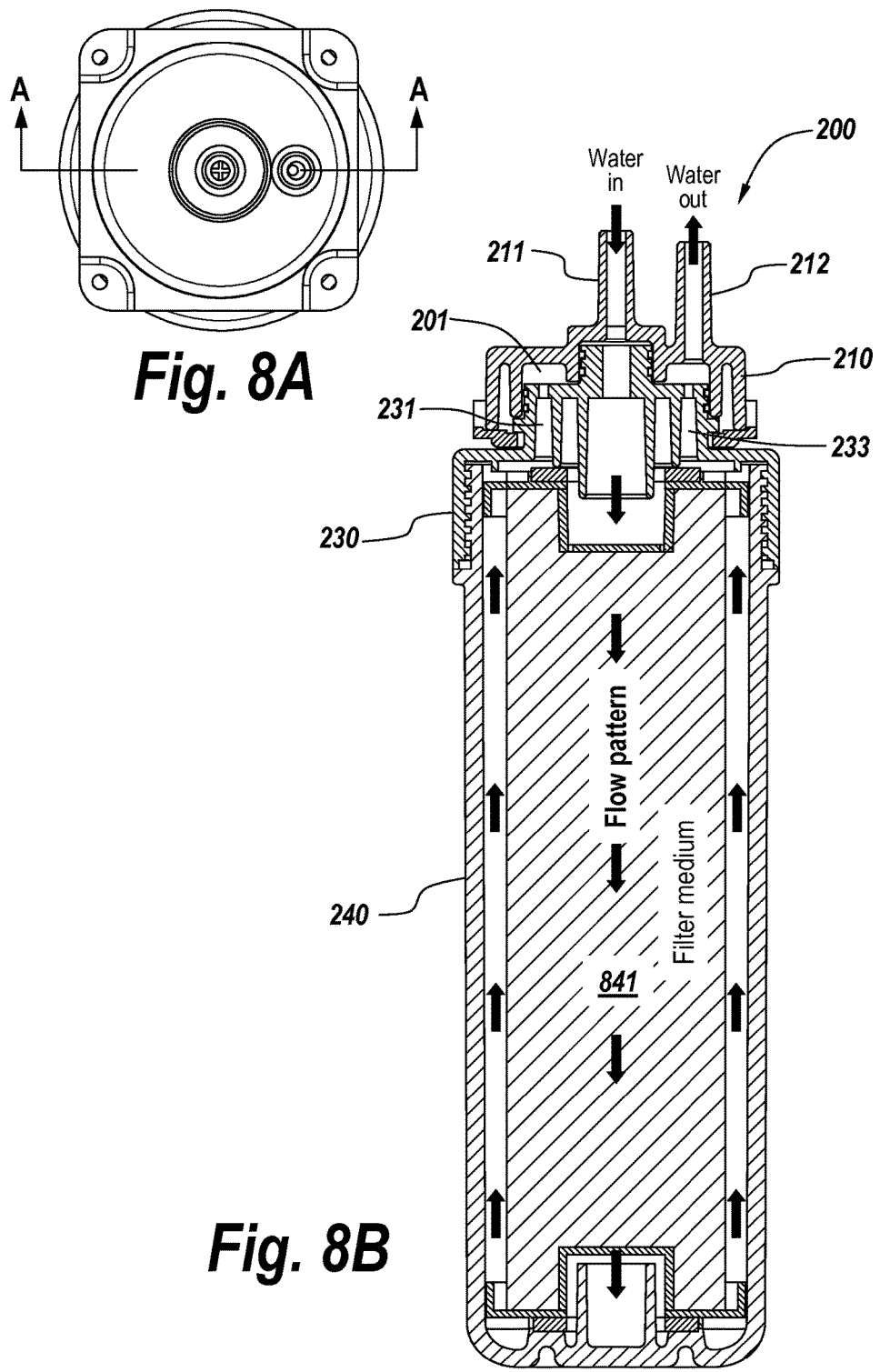

DISPOSABLE FILTER CARTRIDGE FOR WATER DISPENSER

CROSS-REFERENCE TO RELATED APPLICATIONS

This application is a continuation of International Application Number PCT/US2012/044041, filed Jun. 25, 2012, which claims the benefit of U.S. Provisional Patent Application Ser. No. 61/500,469 filed Jun. 23, 2011, the entire contents of each of which are in are incorporated by reference herein.

This application is also related to U.S. Provisional Application Nos. 61/500,451, 61/500,469, 61/500,500, 61/500,440, 61/500,461, each filed Jun. 23, 2011, and U.S. Provisional Application No. 61/654,487, filed Jun. 1, 2012. The entire contents of each of the foregoing applications are incorporated by reference herein.

BACKGROUND

A water filter removes impurities from water by using, e.g., a fine physical barrier, a physical process, a chemical process or a biological process. Filters cleanse water to various extents for numerous applications including irrigation, drinking water, aquariums, and swimming pools. Point-of-use filters for home use mostly include granular-activated carbon filters (GAC), powdered-activated carbon (PAC), metallic alloy filters, microporous ceramic filters, ion exchange resins, carbon block resin (CBR) and ultrafiltration membranes.

Water filters may be incorporated in various types of devices including water or other drink dispensers. These dispensers may be stand alone units, or may be integrated into other appliances, such as a refrigerator. Typically, filters are used up over time, and must be replaced periodically. In some cases, the manufacturer of the dispenser may wish to provide proprietary replacement filters matched to a given dispenser type, and to prevent the use of unauthorized filters.

SUMMARY

Embodiments of the disclosed subject matter include a disposable filter cartridge that includes a receiving member to hold a filter, which may be coupled to the receiving member. The receiving member includes at least one partial flange, which, when twisted into a recess formed by an interference fit of a first locking member and a second locking member, secures the receiving member within the recess. The receiving member or the filter may include a lock, such as an agnail lock, a bevel lock, or a spring bearing lock, to permanently secure the receiving member to the filter.

In some cases, the first and second locking members are injection-molded and may be coupled together via an interference fit. At least one of the receiving member, the first locking member, and the second locking member may include an o-ring to form a water-tight seal between the filter and at least one fluid channel defined by the receiving member.

In one aspect, a disposable filter cartridge is disclosed including: a receiving member to hold a filter, where the receiving member includes at least one partial flange, which, when twisted into a recess formed by an interference fit of a first locking member and a second locking member, secures the receiving member within the recess.

In some embodiments, the cartridge is in combination with the first and second locking members.

In some embodiments, at least one of the receiving member, first locking member, and second locking member includes an o-ring to form a water-tight seal between the filter and at least one fluid channel defined by the receiving member.

Some embodiments include a filter coupled to the receiving member.

In some embodiments, the receiving member further includes a lock to permanently secure the receiving member to the filter.

In some embodiments, the lock is at least one of an agnail lock, a bevel lock, and a spring bearing lock.

In some embodiments, the first locking member includes and inlet/outlet attachment configured to allow flow of fluid into and out of the filter cartridge.

In some embodiments, the second locking member includes a support bracket.

In some embodiments, the receiving member includes a filter cap.

In some embodiments, when assembled together for form a locking assembly, the inlet/outlet attachment and support bracket define a recess bounded on one side by the lower edge of the inlet/outlet attachment and other side by a rim along an aperture in the support bracket.

In some embodiments, the support bracket includes one or more twist-and-lock features protruding from the edge of the aperture, configured such that the twist-and-lock features define a guide path for one end of the filter cap.

Some embodiments include a lock well at the end of each twist-and-lock feature that engages a complementary feature on the filter cap to secure the filter cap to the locking assembly.

Some embodiments include a stopper at the end of each twist-and-lock feature that prevents the filter cap from being twisted too far into the recess; configured such that mechanical resistance from the stopper alerts the installer that the filter cap is fully inserted into the recess. In some embodiments, each twist-and-lock feature also includes a dislodge aid that facilitates removal of the filter cap from the recess.

Some embodiments include a filter container configured to receive a filter, and to be attached to the filter cap to form the filter cartridge.

Some embodiments include cartridge positioning aids on at least one of the filter cap and the filter container configured to act to properly seat the filter in the assembled filter cartridge.

Some embodiments include one or more water shut-off rims and one or more gaskets coupled together to separate and prevent incoming unfiltered water from mixing with and contaminating the filtered water exiting the filter.

In some embodiments, the filter cap is configured to screws onto a threaded portion at the top of the filter container to seal the filter inside the filter cartridge.

Some embodiments are configured such that screwing the filter cap fully onto the filter container causes a lock on the filter container to engage the filter cap, such that once engaged, the lock permanently secures the filter container to the filter cap without adhesives, heat treatment, or any other additional materials or steps.

In some embodiments, an o-ring fits into a groove in the filter cap to create a watertight seal between the filter cap and the filter container once the filter cap is locked to the filter container.

In some embodiments, the lock includes at least one selected from the list consisting of: an agnail lock, a bevel lock, and a spring bearing lock In some embodiments, the filter cap includes a cylindrical shoulder that protrudes from a central region of the filter cap; a cylindrical plug extends from a central region of the cylindrical shoulder; a cylindrical inner channel and one or more cylindrical outer channels run through the plug and shoulder, respectively, to the inside of the assembled disposable filter cartridge; and an inflow and outflow separating wall prevents fluid from spilling between the inner channel and the outer channel without flowing through filtration media in a body of the filter container.

In some embodiments, the filter cap includes one or more partial flanges protruding from the shoulder, each partial flange including: a mount shoulder, a lodge aid, and a lock, the mount shoulder, lodge aid and lock configured to mount and nest the filter cartridge.

In some embodiments, the filter cap and filter container are configured to be installed into the locking assembly by: inserting the plug into the central aperture in the support bracket; and twisting the filter container with respect to the locking assembly to causes the partial flanges to engage the twist-and-lock features along the recess defined by the assembled inlet/outlet attachment and the support bracket.

In some embodiments, a surface of the inlet/outlet attachment and the twist-and-lock features engage to prevent the filter container from being twisted beyond predetermined angle.

In some embodiments, when the disposable filter cartridge is locked in position, one or more o-rings in grooves about the outer surfaces of the plug and the shoulder create a watertight seal between the assembled filter cap and filter container and the locking assembly, such that the assembled filter cap and filter container may be disengaged from the locking assembly by twisting in an opposite direction to that used for attachment In some embodiments, the cartridge is configured to allow circulation of fluids through a filter or filtration media in the filter container via the an inlet port and an outlet port extending from the inlet/outlet attachment.

In some embodiments, the inlet port is a centrally located port connects to a central channel in the filter cap to allow fluid to flow from a fluid line along the longitudinal axis of the disposable filter cartridge; and the outlet port is offset from the centrally located port and connects to one or more other channels in the filter cap via a toroidal chamber formed between the bottom of the inlet/outlet attachment and the upper surface of the shoulder.

In some embodiments, the cartridge is configured such that fluid can travel in through the inlet port, along a linear flow path along the longitudinal axis of the filter container filed with filtration media, and along a return path along an outer edge of the filtration media to the outlet port.

In some embodiments, the outlet port is a centrally located port connects to a central channel in the filter cap to allow fluid to flow to a fluid line from a direction along the longitudinal axis of the disposable filter cartridge; and the inlet port is offset from the centrally located port and connects to one or more other channels in the filter cap via a toroidal chamber formed between the bottom of the inlet/outlet attachment and the upper surface of the shoulder.

In some embodiments, the cartridge is configured such that fluid can travel in through the inlet port, along a path along an outer edge of filtration media in the filter container, through the media, and to the outlet port along a linear return flow path along the longitudinal axis of the filter container.

In some embodiments, the cartridge cannot be disassembled without breaking the cartridge.

In some embodiments, other flow patterns can also be used. For in some embodiments, a radial filter that channels water or other fluid in a radial flow pattern towards the wall of the filter container is used. In some embodiments, a radial filter that channels water from the outer walls of the filter container towards the longitudinal axis of the filter container is used. In various embodiments, to change from a radial flow to a linear flow, a secondary adapter is used internally to direct the flow evenly from the bottom to the top or from the top to the bottom In another aspect, a method is disclosed including: obtaining the disposable filter cartridge of any of the types described herein; and directing a fluid through the filter cartridge to filter the fluid.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate one or more embodiments described herein and, together with the description, explain these embodiments. Like reference characters refer to the same parts throughout the different views. The drawings are not necessarily to scale, emphasis instead being placed upon illustrating the principles of the embodiments.

FIGS. 8A and 8B are cut-away plan and elevation views, respectively, of a forward linear flow pattern through an exemplary filter assembly.

DETAILED DESCRIPTION

Figure 1:
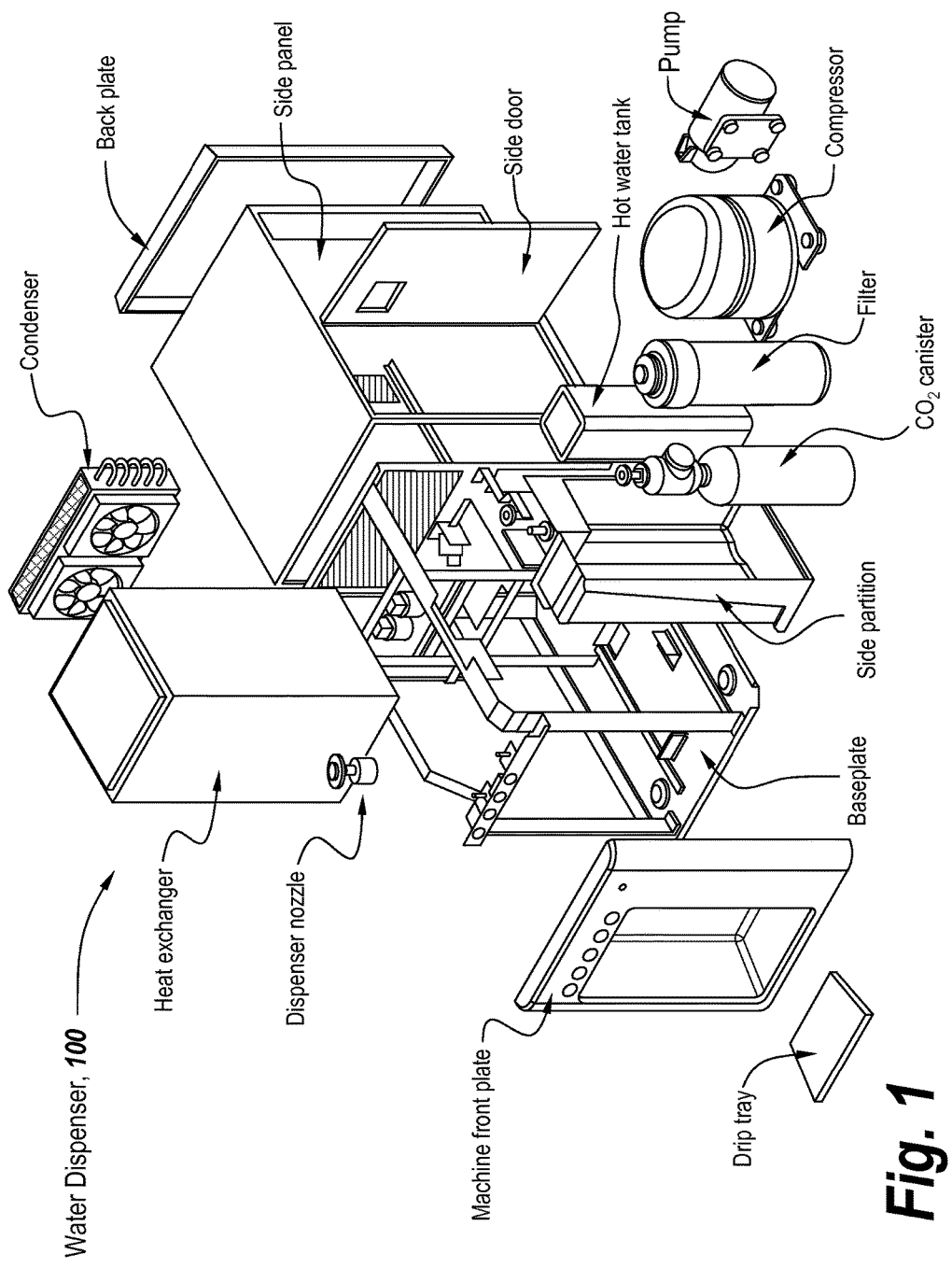
FIG. 1 is an exploded view of a water dispenser incorporating an exemplary filter assembly.

FIG. 1 is an exploded view of a water dispenser 100 that uses a filter assembly 200 to filter water from an external source (not shown). As shown, water dispenser 100 is of the type described in U.S. Patent Application Nos. 61/500,451 and 61/654,487 incorporated by reference above. However, in various embodiments, the filter assembly 200 may be included in any type of beverage dispenser or other type of device requiring filtration. Not that in other embodiments, the filter assembly 200 may be used as a stand alone unit, or with other types of systems which require filtration.

Figure 2:
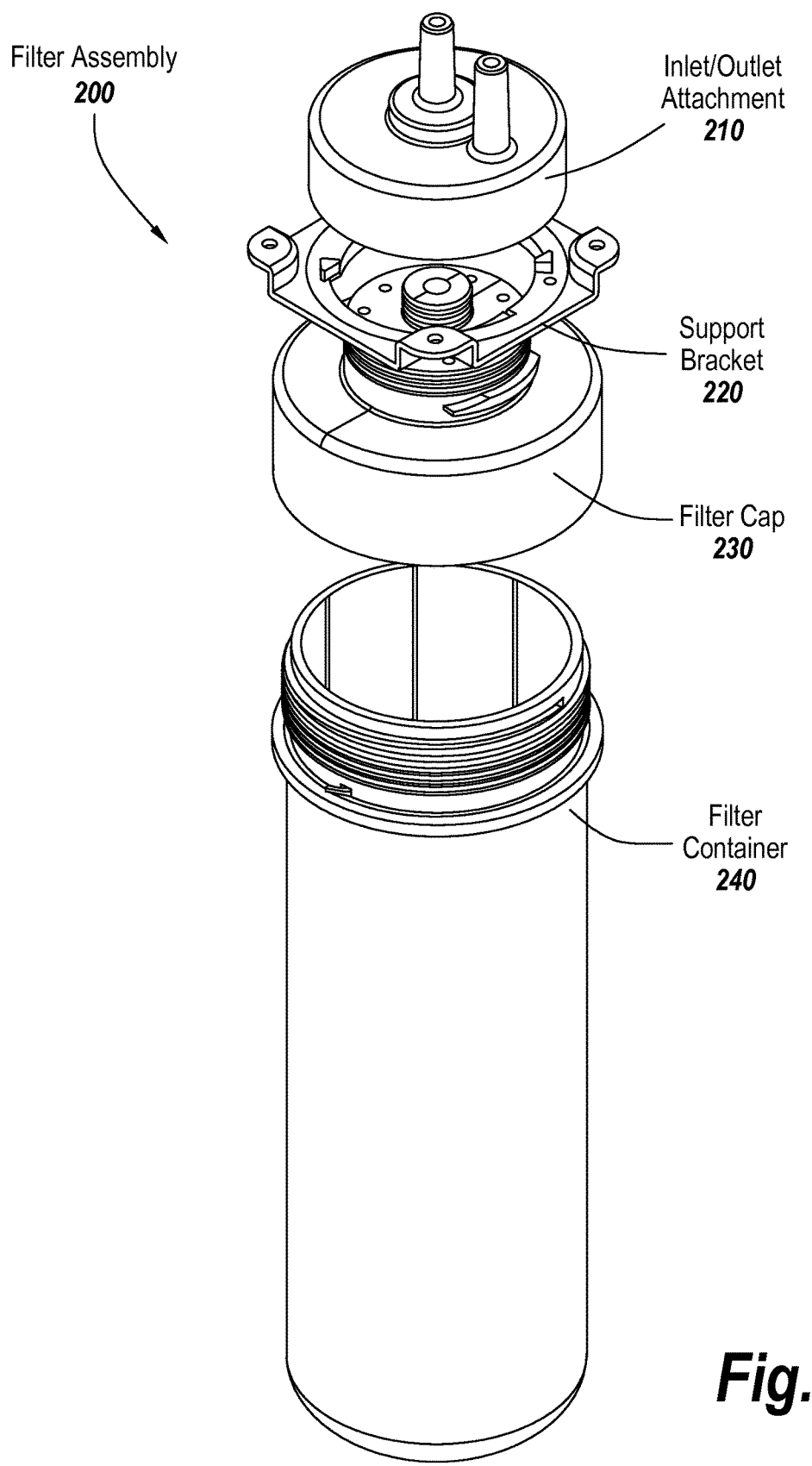
FIG. 2 is an exploded view of the filter assembly of FIG. 1.

FIG. 2 is an exploded view of the filter assembly 200 of FIG. 1. The filter assembly 200 includes an inlet/outlet attachment (first locking member) 210, support bracket (second locking member) 220, filter cap (receiving member) 230, and filter container 240. The filter cap 230 and filter container 240 can be joined to form a disposable filter cartridge (described below) that holds one of a variety of filters. The filter cartridge can be sold separately from the inlet/outlet attachment 210 and support bracket 220, which can be sold separately, together, or attached to the water dispenser 100. Each piece of the filter assembly 200 can be made individually using standard injection-molding techniques. The pieces of the filter assembly 200 can be made of standard injection-molding materials, including, but not limited to, thermoplastics, such as polypropylene, acrylonitrile butadiene styrene, nylon, polyethylene, polyvinyl chloride, and polystyrene; some thermoset plastics, such as epoxy and phenolic; and even some elastomeric materials. For example, the inlet/outlet attachment 210 and support bracket 220 can be made as individually injection-molded pieces to simplify the manufacturing process and to reduce the cost. O-rings and other sealing components can be made of rubber or some similar elastomeric material. Fully assembled, the filter assembly 200 is roughly cylindrical in shape, with a height of about 8-12 inches tall and a diameter of about 3-4 inches. Those skilled in the art will appreciate that filter assemblies can be made in other sizes and shapes as well.

Figure 3A:
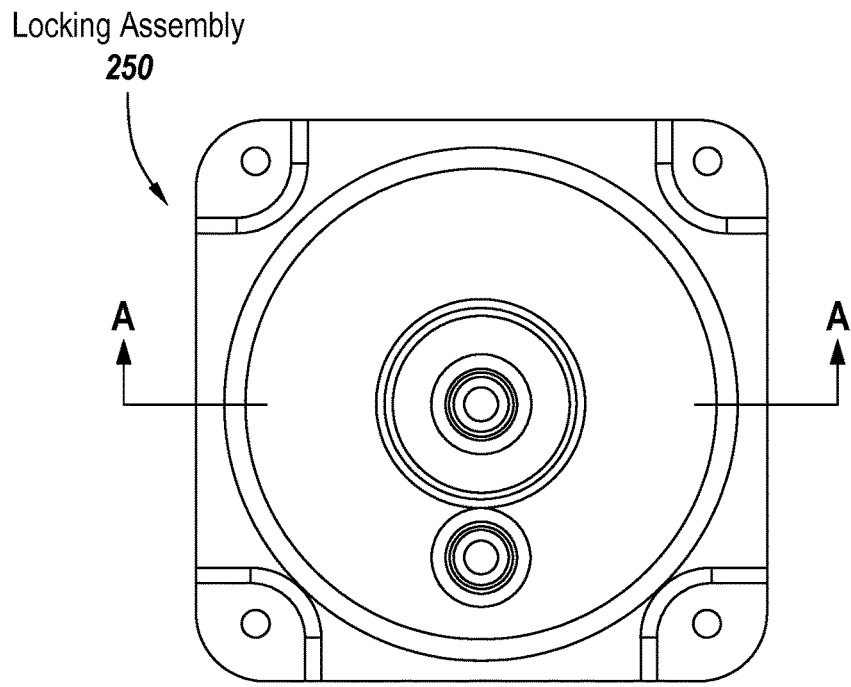
FIGS. 3A-3C show different views of an exemplary locking assembly formed of the inlet/outlet attachment and support bracket of FIG. 2.
Figure 3B:
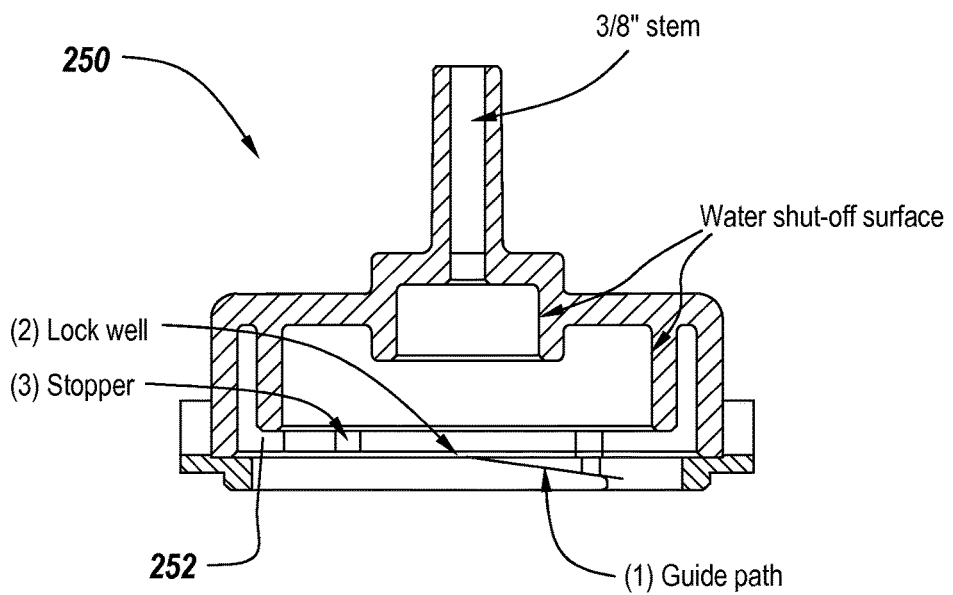
Figure 3C:
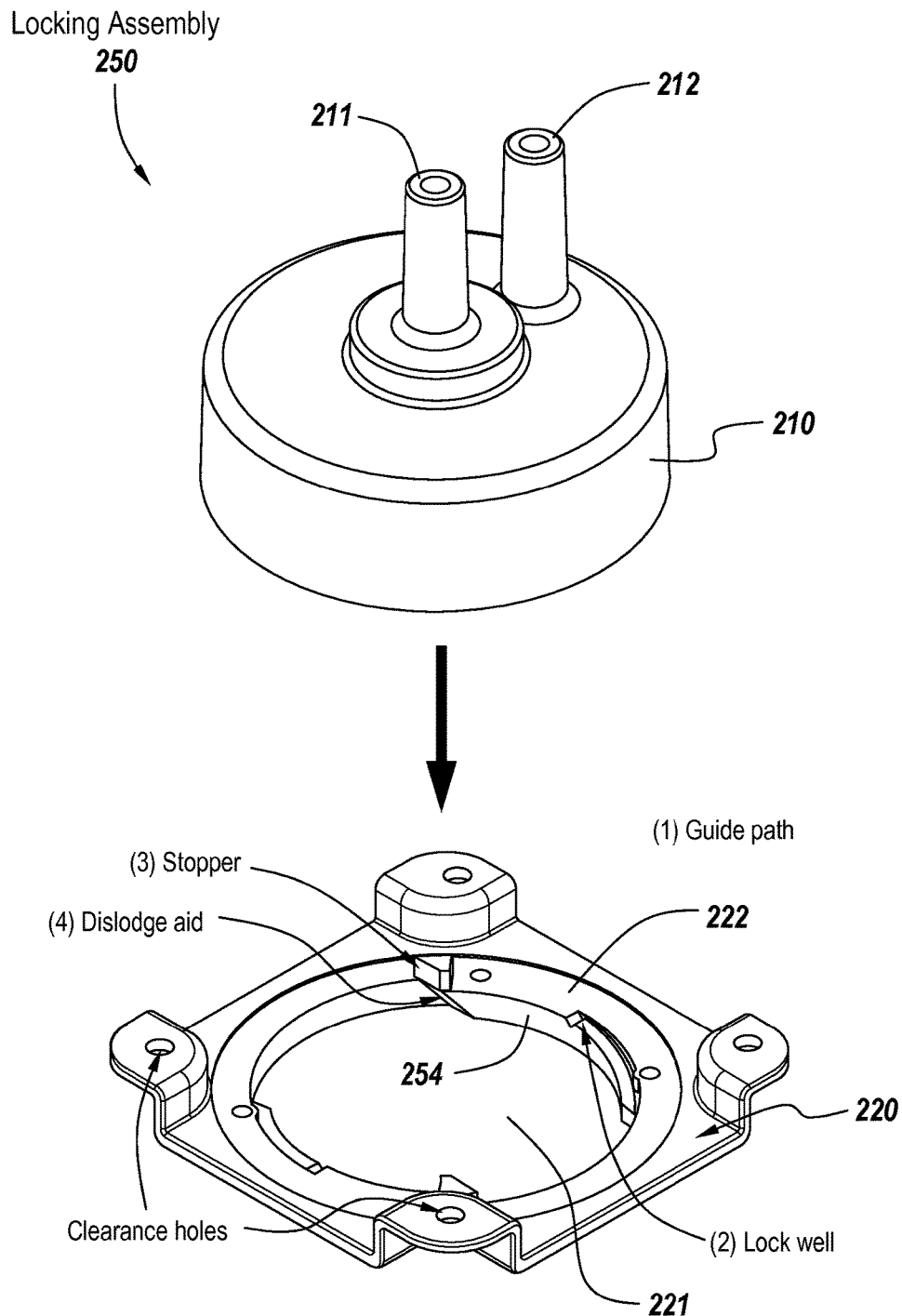

FIGS. 3A, 3B, and 3C show plan, elevation, and exploded views, respectively, of a locking assembly 250 formed by the inlet/outlet attachment 210 and the support bracket 220. The locking assembly 250 is put together by fitting the inlet/outlet attachment 210 into a rim 222 that runs along a central aperture 221 defined by the support bracket 220. Once it is positioned properly, the inlet/outlet attachment 210 is screwed, bolted, riveted, or otherwise affixed to the support bracket 220 to form an interference fit. The locking assembly 250 is connected to the water dispenser 100 with screws, bolts, or rivets that fit through clearance holes at the corners of the support bracket 220. The support bracket 220 can be designed in several ways to allow horizontal or vertical mounting of the filter assembly. A central fluid port 211 and an offset fluid port 212 with ⅜-inch stems extending from the top of the inlet/outlet attachment 210 connect to fluid (e.g., water) lines that run into and out of the filter assembly 200. The fluid ports 211 and 212, which may be permanently fixed or removable, can be connected to the fluid lines via any suitable type of push-in connector. Alternatively, NPT fittings can be used for fluid ports 211 and 212.

When put together to form the locking assembly 250, the inlet/outlet attachment 210 and support bracket 220 define a recess 252 bounded on one side by the lower edge of the inlet/outlet attachment 210 and other side by the rim 222 along the central aperture 221 in the support bracket 220. The support bracket 220 also includes one or more twist-and-lock features 254 protruding from the edge of the central aperture 221. Together, the twist-and-lock features 254 define a guide path (1) for one end of the filter cap 230. A lock well (2) at the end of each twist-and-lock feature 254 engages a complementary feature on the filter cap 230 to secure the filter cap 230 to the locking assembly 250. A stopper at the end of each twist-and-lock feature 254 prevents the filter cap 230 from being twisted too far into the recess 252; mechanical resistance from the stopper (3) alerts the installer that the filter cap 230 is fully inserted into the recess 252. Each twist-and-lock feature 254 also includes a dislodge aid (4) that facilitates removal of the filter cap 230 from the recess 252.

Figure 4A:
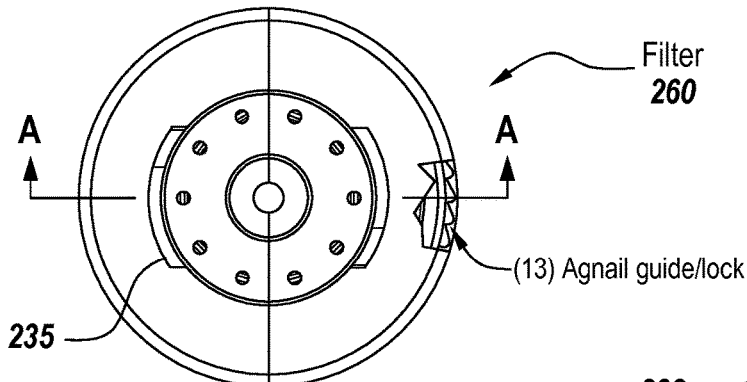
FIGS. 4A-4C show different views of exemplary disposable filter cartridge formed of the filter cap and filter container of FIG. 2.
Figure 4B:
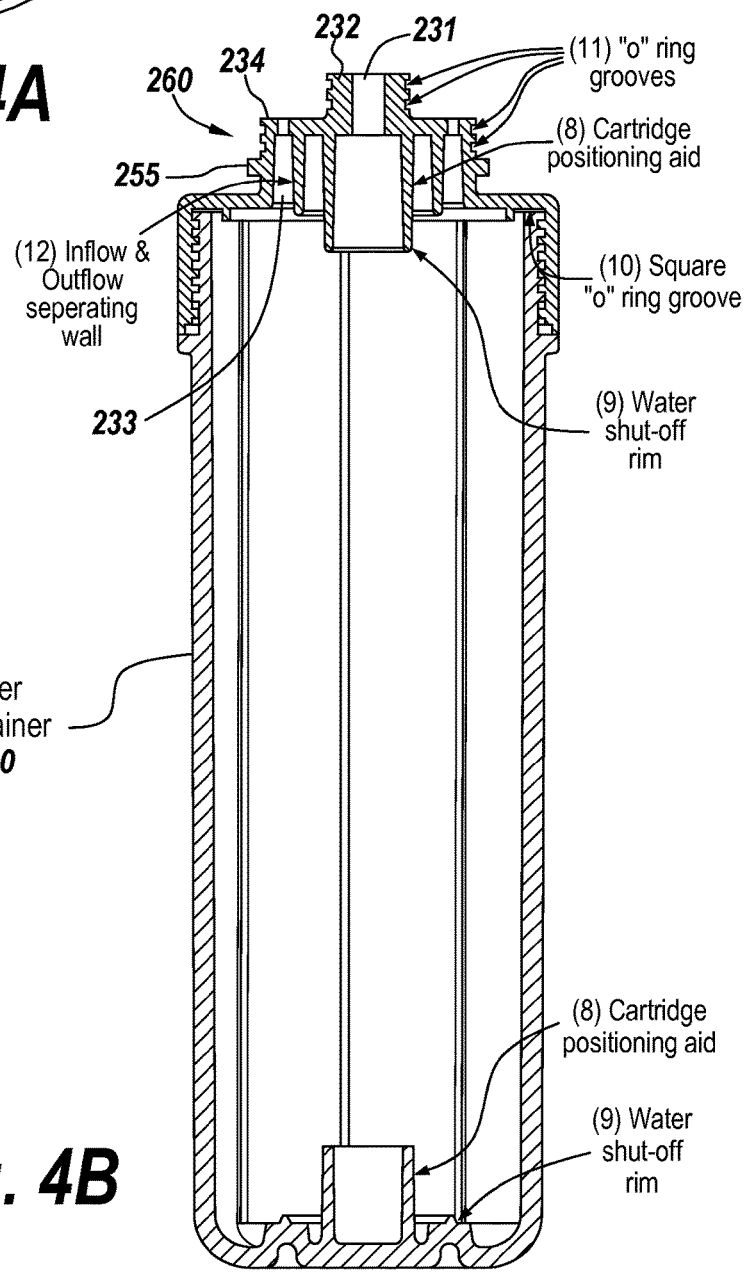
Figure 4C:
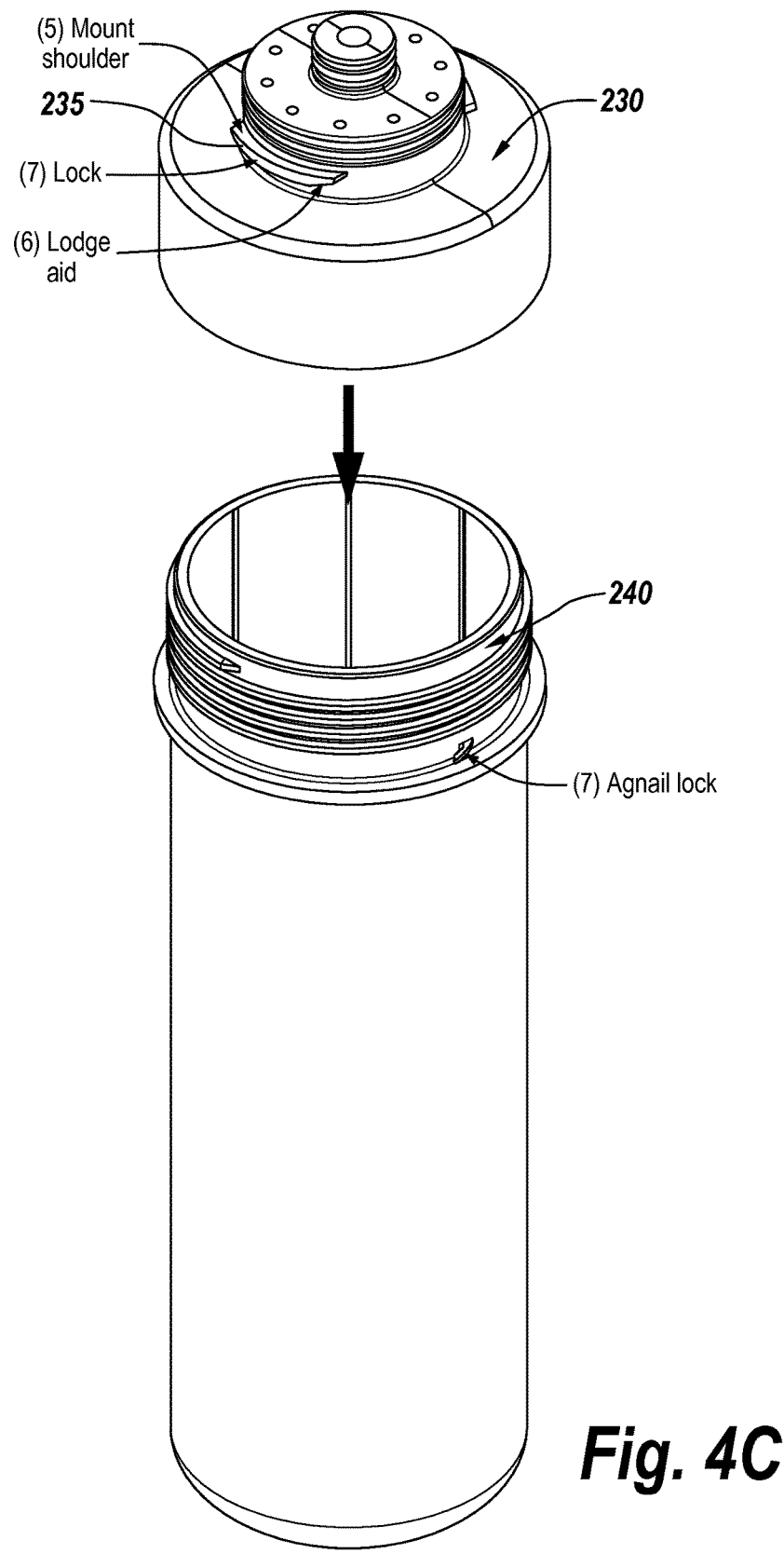

FIGS. 4A, 4B, and 4C show plan, elevation, and exploded views, respectively, of a disposable filter cartridge 260 assembled from a filter cap 230 and an empty filter container 240, which can accommodate various types of filters and filtration media including, but not limited to, carbon block; powdered filtration media; granular filtration media (e.g., granular-activated carbon filters); metallic alloy filters; microporous ceramic filters; carbon block resin (CBR); ion exchange resins and ultrafiltration membranes; and any other suitable type of filtration media. Other suitable filters and filtration media include sedimentation filters, microfiltration membranes, nanofiltration membranes, ultrafiltration membranes, reverse osmosis membranes, ion exchange resins, zeolites, adsorption media, and electrostatically charged solid media. Some filters (e.g., multi-barrier filters) may include more than one type of filtration media and/or may implement more than one type of filtration. Parts and joints in the filter container 240, such as the top and housing of the filter container 240, can be made water tight by spin welding, sonic welding or using suitable epoxy or pipe cement to glue parts together.

The filter cartridge 260 is assembled by inserting a filter (not shown), such as a 10" by 2.5" cylindrical filter, into the filter container 240. Cartridge positioning aids (8) on the filter cap 230 and the filter container 240 act to properly seat the filter in the assembled filter cartridge 260. Water shut-off rims (9), coupled with the cartridge's gaskets separate and prevent the incoming unfiltered water from mixing with and contaminating the filtered water. The filter cap 230 screws onto a threaded portion at the top of the filter container 240 to seal the filter inside the filter cartridge 240. In some embodiments, the threaded portion includes an Acme thread form, which has a 29° thread angle, a thread height equal to half of the thread pitch, a flat apex, and a flat valley. Screwing the filter cap 230 all the way onto the filter container 240 causes an agnail lock (7) on the filter container 240 to engage the filter cap 230. Once engaged, the agnail lock (7) permanently secures the filter container 240 to the filter cap 230 without adhesives, heat treatment, or any other additional materials or steps. Exemplary disposable filter cartridges cannot be disassembled without breaking. An o-ring with a square cross section fits into a groove in the filter cap 230 to create a watertight seal between the filter cap 230 and the filter container 240 once the filter cap 230 is locked to the filter container 240.

Figure 6A:
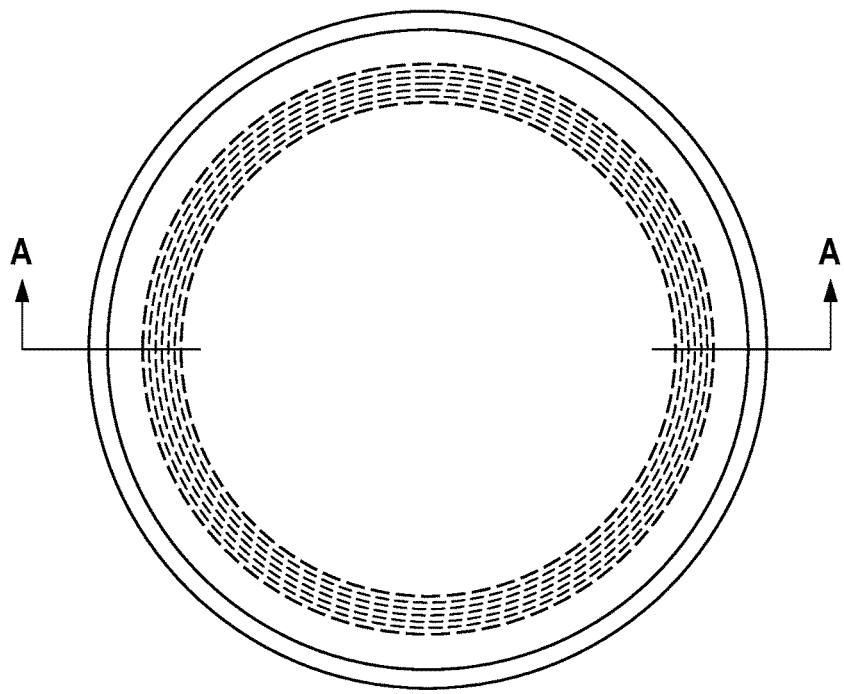
FIGS. 6A and 6B are cut-away plan and elevation views, respectively, of an alternative filter cartridge.
Figure 6B:
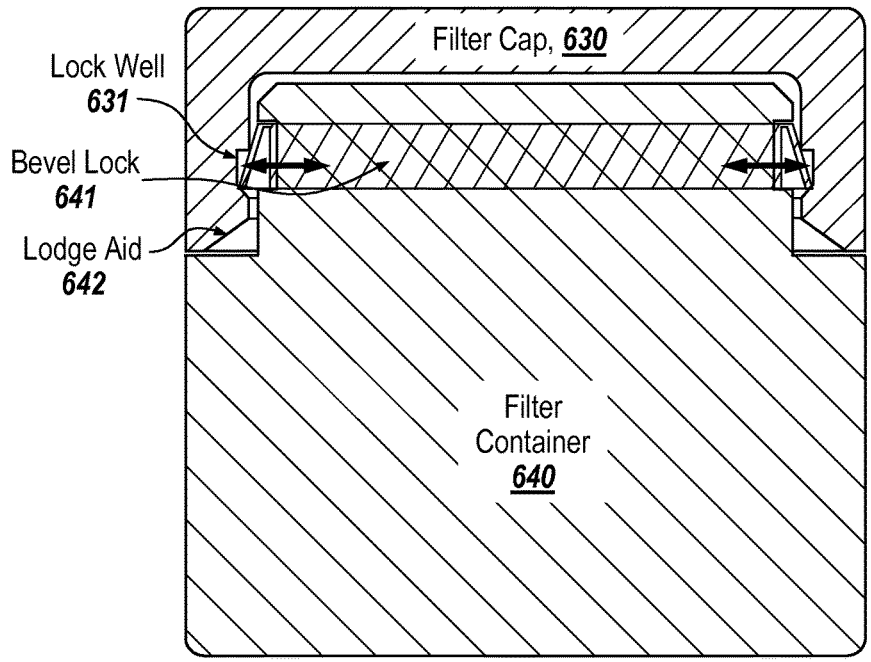

Filter caps and filters may be secured together with other locks as well. For example, FIGS. 6A and 6B show cutaway plan and elevation views, respectively, of an alternative filter cap 630 and filter 640 secured together with a bevel lock 641. A lodge aid 642 guides and facilitate the insertion of guide mechanism; bevel lock 641 and spring bearing lock 741. The bevel lock 641 includes a thin sheet of flexible or semi-rigid material that extends from one of a flange on one end of the filter 640. In its relaxed state, the bevel lock 641 forms an acute angle with the sidewall of the flange. To engage the bevel lock 641, a user inserts the filter 640 into an aperture in the filter cap 630, which forces the bevel lock 641 against the sidewall of the flange. The bevel lock acts similarly to a belt clip: once the filter 640 is inserted far enough into a lock well 631 in the filter cap 630, the bevel lock 641 springs away from the flange and catches in the lock well 631 to secure the filter 640 to the filter cap 630.

Figure 7A:
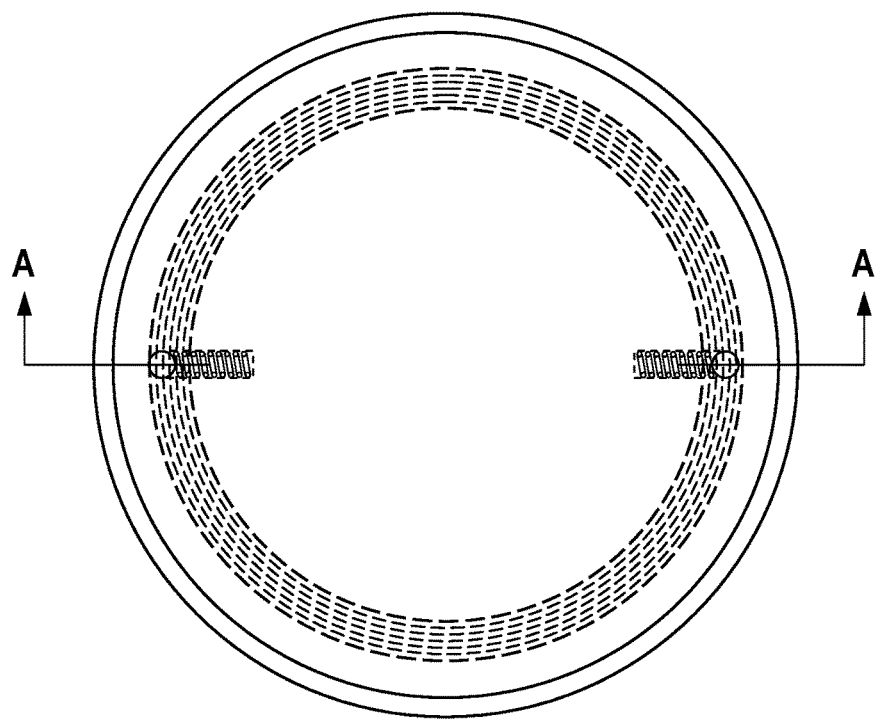
FIGS. 7A and 7B are cut-away plan and elevation views, respectively, of another alternative filter cartridge.
Figure 7B:
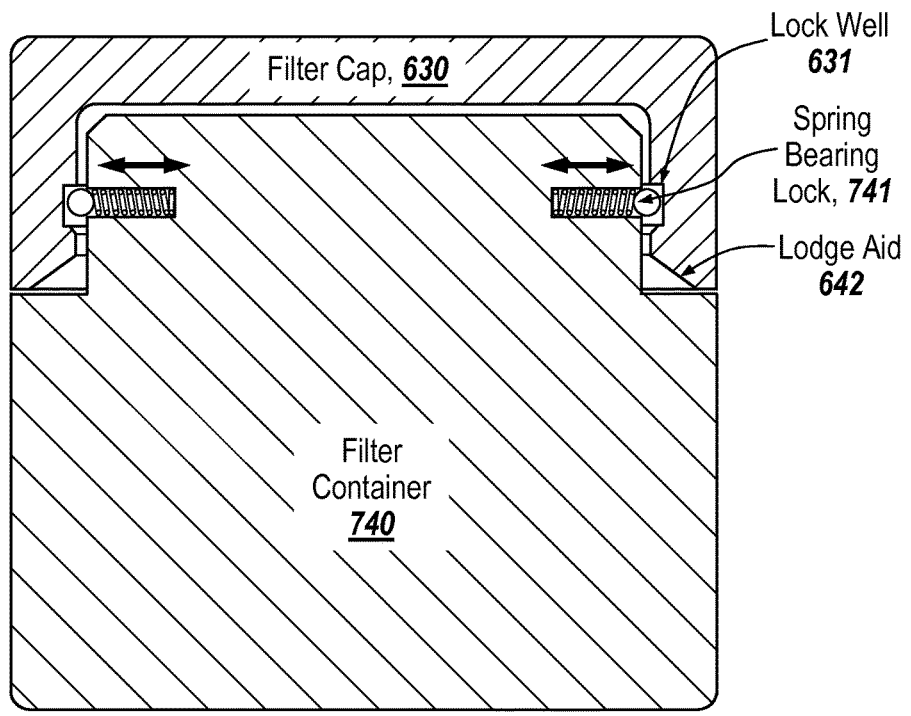

The alternative filter cap 630 can also be used to hold a filter 740 with one or more spring-bearing locks 741 as shown in FIGS. 7A and 7B. Each spring-bearing lock 741 includes a coil spring disposed within a cavity in the filter 740 or one of the disposable filter cartridge's constituent components (e.g., a filter cap). One end of the coil spring is anchored within the cavity; the other end of the coil spring is attached to a ball bearing that protrudes slightly from cavity. To engage the spring-bearing lock 741, a user inserts the filter 740 into the aperture in the filter cap 630. As the filter 740 is pushed into the aperture, the inner wall of the aperture compresses the spring-bearing lock into the cavity. Eventually, once the spring-bearing lock 741 is pushed deep enough to align with the lock well 631 in the filter cap 630, the spring-bearing lock 741 expands, forcing the bearing into the lock well 631 to lock the filter 740 within the filter cap 630.

Those of skill in the art will appreciate that exemplary filters and filter cartridges can be coupled together with other locks and/or with combinations of locks. In addition, the locks may be disposed on the filter cap instead of on the filter. Locks may also be disposed on both the filter and the filter cap. Some locks may be interchangeable; for example, the filter cap 630 shown in FIGS. 6 and 7 can be used with both bevel locks and spring bearing locks. In every case, however, the lock creates an everlasting bond between the filter cap and the filter container, making it impossible to open the filter cartridge without making the filter cartridge unsuitable for further use or repair.

Referring again to FIGS. 4A-4C, the filter cap 230 includes a cylindrical shoulder 234 that protrudes from the center of the filter cap 230. A cylindrical plug 232 extends from the center of the cylindrical shoulder 234. A cylindrical inner channel 231 and one or more cylindrical outer channels 233 run through the plug 232 and shoulder 234, respectively, to the inside of the assembled disposable filter cartridge 260 as shown in FIG. 4B. An inflow and outflow separating wall (12) prevents fluid from spilling between the inner channel 231 into the outer channel(s) 233 without flowing through the filtration media in the body of the filter container 240.

Figure 5:
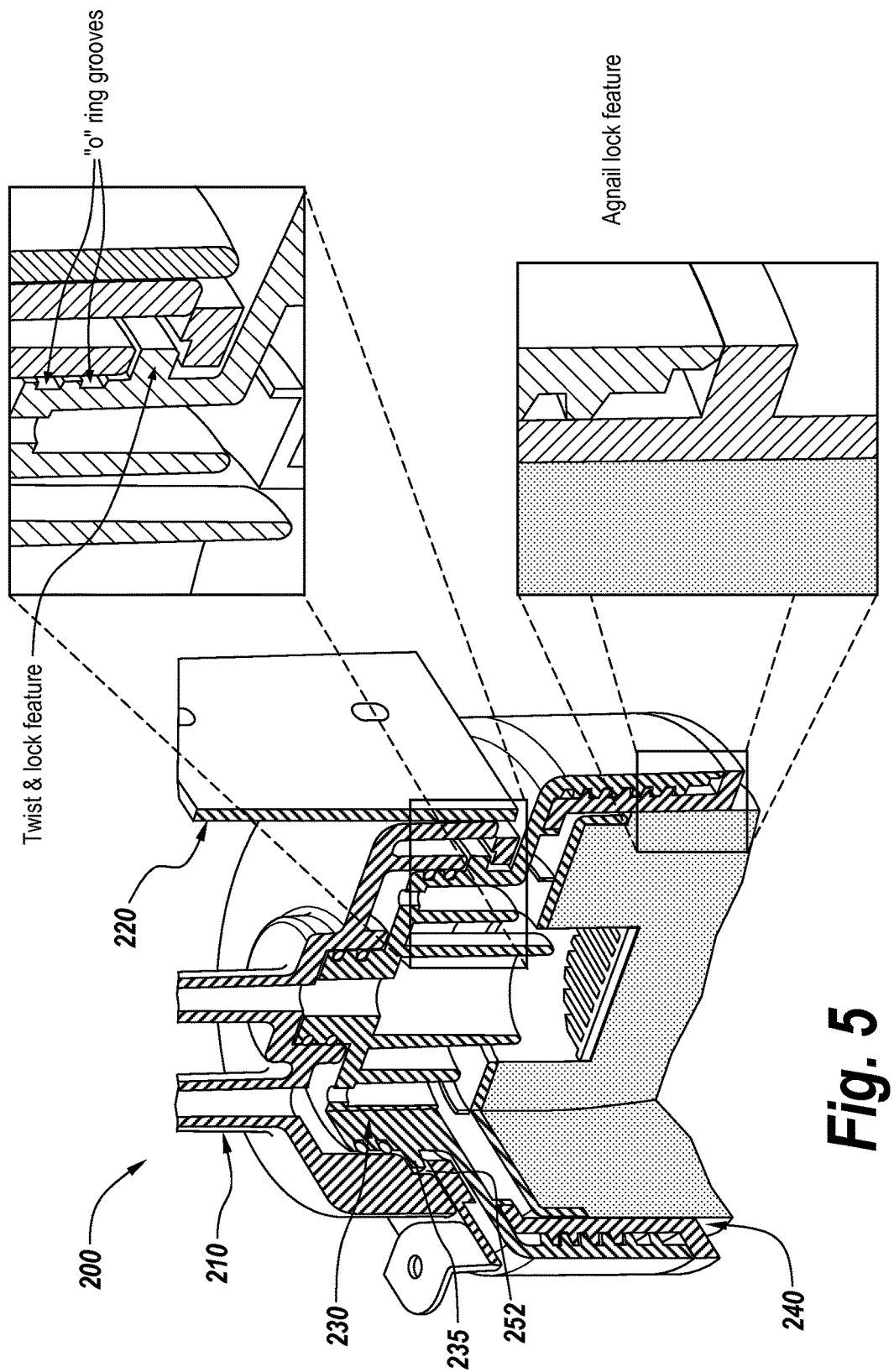
FIG. 5 shows several cut-away views of the locking assembly of FIGS. 3A-3C secured to the filter cap of FIGS. 4A-4C.

The filter cap 230 also includes one or more partial flanges 235 protruding from the shoulder 234. Each partial flange 235 includes a mount shoulder (5), lodge aid (6), and lock (7), as shown in FIG. 4C. These features mount and nest the filter 260 and allows the filter 260 to replaceable. The disposable filter cartridge 260 is installed into the locking assembly 250 by inserting the plug 232 into the central aperture 221 in the support bracket 220. Twisting the disposable filter cartridge 260 with respect to the locking assembly 250 causes the partial flanges 235 to engage the twist-and-lock features 254 along the recess 252 defined by the assembled inlet/outlet attachment 210 and the support bracket 220, as shown in FIG. 5, which is a cutaway view of the disposable filter cartridge 260 fully inserted and locked into the locking assembly 250. The lower surface of the inlet/outlet attachment 210 and the twist-and-lock features 254 prevent the disposable filter cartridge 260 from being twisted to a predetermined angle, e.g., about 30°, 45°, or 60° clockwise (when viewed looking from the filter cartridge 260 towards the locking assembly 250). When the disposable filter cartridge 260 is locked in position, one or more o-rings in grooves about the outer surfaces of the plug 232 and the shoulder 234 create a watertight seal between the disposable filter cartridge 260 and the locking assembly 250. The disposable filter cartridge 260 may be disengaged from the locking assembly 260 by simply twisting in the opposite direction, e.g., counterclockwise.

Unlike other attachment features, the partial flanges 235 and twist-and-lock features 254 described above provides one or more clear indications that the disposable filter cartridge 260 is locked to the locking assembly 250. For instance, the disposable filter cartridge 260 may audibly snap or click into position to alert the user that it is properly positioned. Alternatively, or in addition, the locking assembly 250 and/or the disposable filter cartridge 260 may be marked with grooves, decals, stickers, painted lines, or other fiducial markings that, when aligned, indicate that the locking assembly 250 and the disposable filter cartridge 260 are secured together. The locking assembly 250 may also include windows or apertures that allow the user to visually inspect the partial flanges 235 and twist-and-lock features 254 and to verify that the partial flanges 235 are properly seated in the recess 252.

Figure 9A:
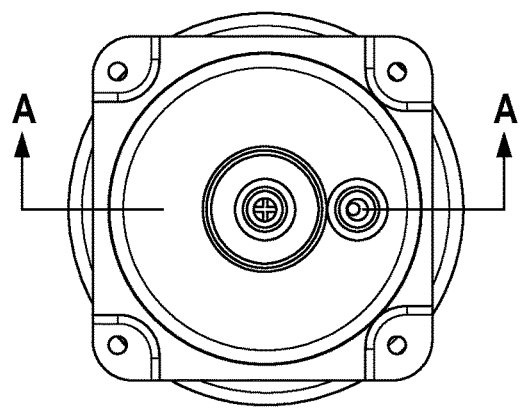
FIGS. 9A and 9B are cut-away plan and elevation views, respectively, of a backward linear flow pattern through an exemplary filter assembly.
Figure 9B:
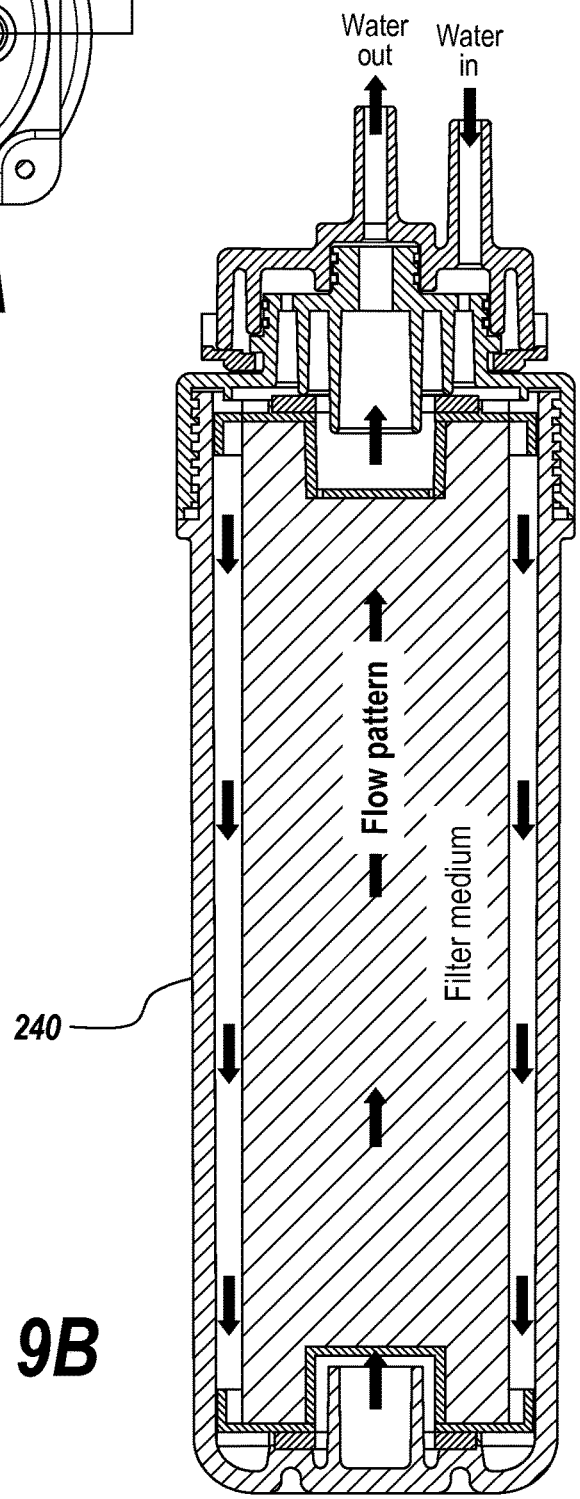

Locking together the locking assembly 250 and the disposable filter cartridge 260 makes it possible to circulate water and/or other fluids through a filter or filtration media in the disposable filter cartridge 260 via the ports 211 and 212 extending from the inlet/outlet attachment 210. The central port 211 connects to the central channel 231 in the filter cap 220 to allow fluid to flow from a fluid line (not shown) along the longitudinal axis of the disposable filter cartridge 200. The offset port 212 connects to the other channels 233 in the filter cap 230 via a toroidal chamber 201 formed between the bottom of the inlet/outlet attachment 210 and the upper surface of the shoulder 234. As shown in FIGS. 8A and 8B, fluid can travel in through the central port 211, along a linear flow path down the longitudinal axis of the filter container 240, which is filled with powdered or granular filtration media 841, and along a return path along the outer edge of the filtration media to the offset port 212. Fluid can also be channeled in the opposite direction as shown in FIGS. 9A and 9B by hooking the central port 211 to the output line and the other port 212 to the input line and using an appropriate filter 941.

Figure 10A:
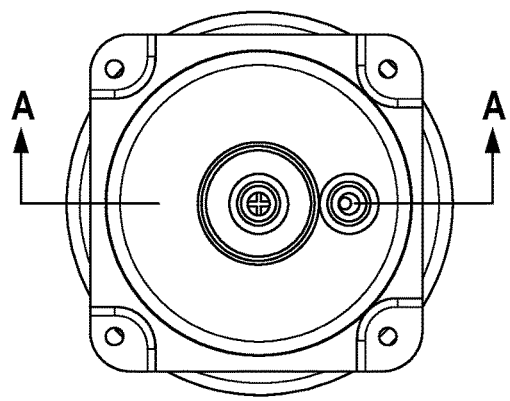
FIGS. 10A and 10B are cut-away plan and elevation views, respectively, of a forward radial flow pattern through an exemplary filter assembly.
Figure 10B:
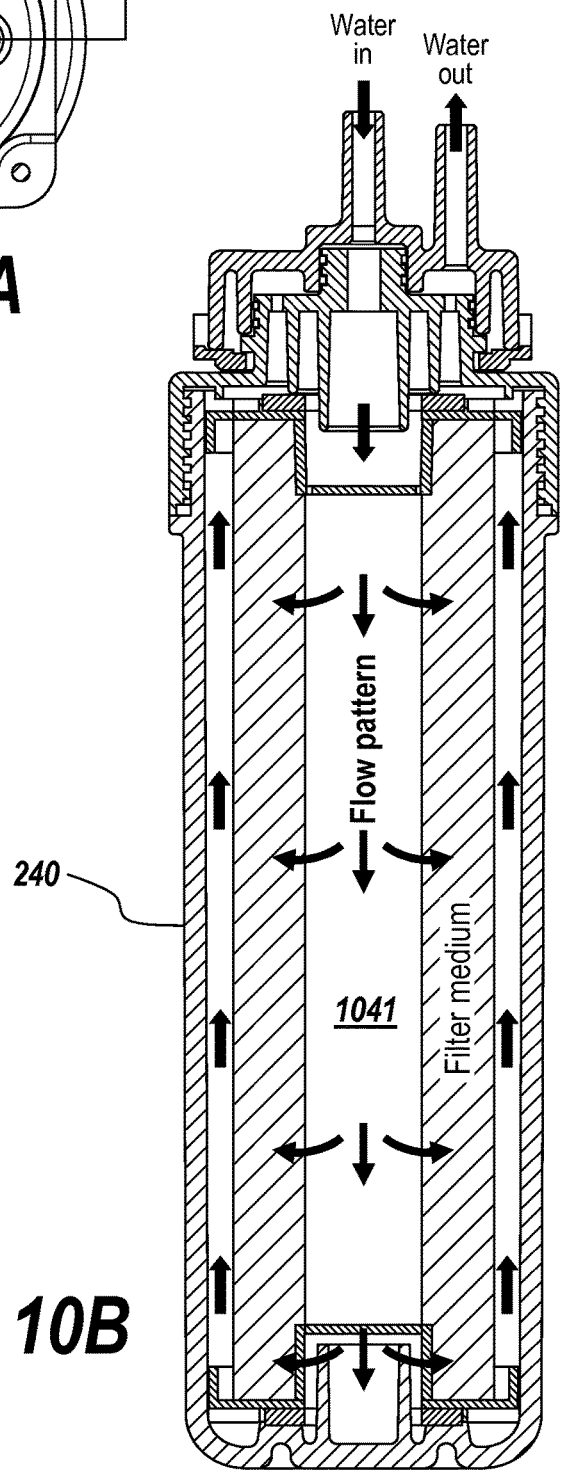
Figure 11A:
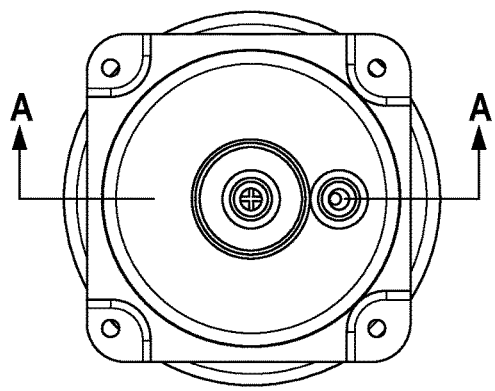
FIGS. 11A and 11B are cut-away plan and elevation views, respectively, of a backward radial flow pattern through an exemplary filter assembly.
Figure 11B:
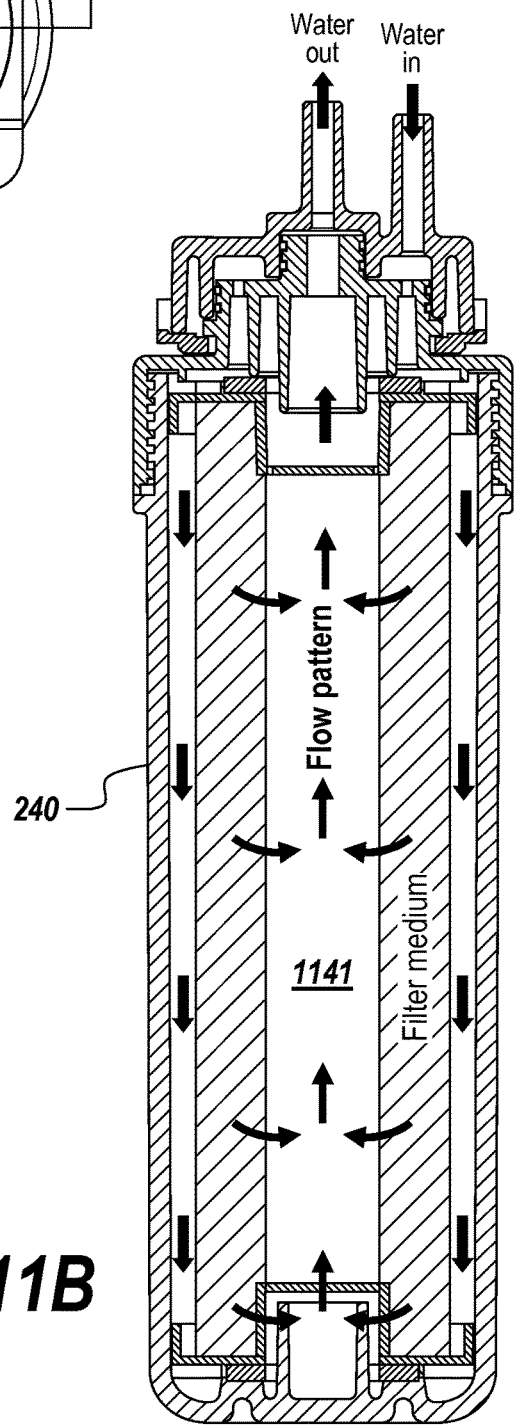
Figure 12A:
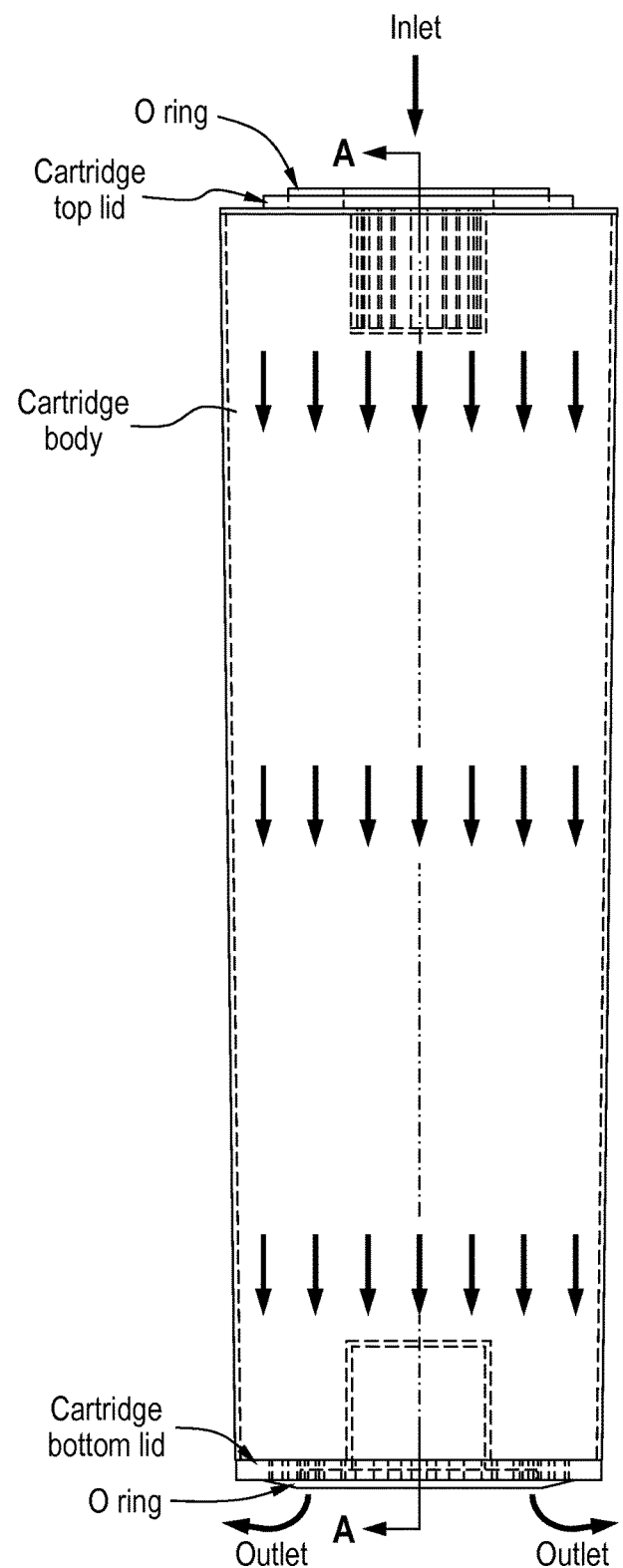
FIGS. 12A, 12B, and 12C are elevation, cut away elevation, and perspective views, respectively, of a secondary adapter.
Figure 12B:
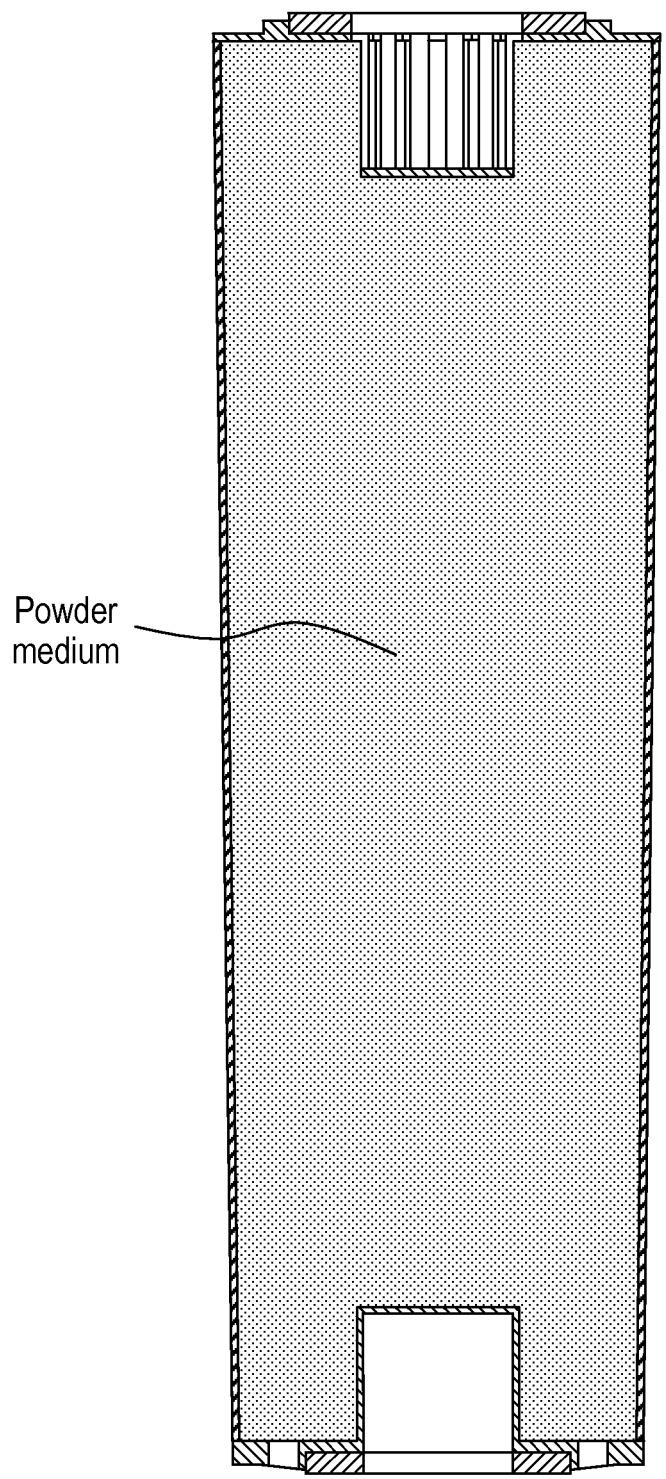
Figure 12C:
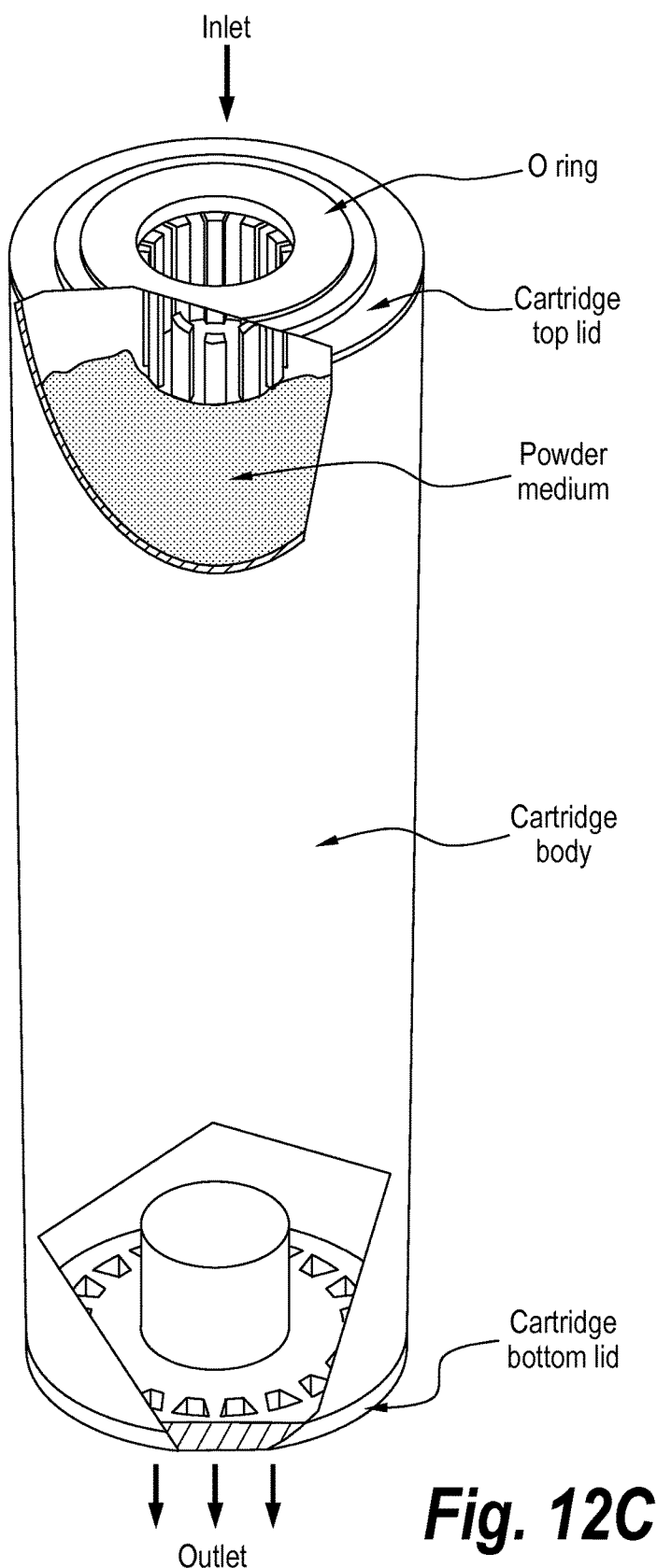

Filters with other flow patterns can also be used to form filter cartridges for use with locking assemblies. For example, FIGS. 10A and 10B show a radial filter 1041 that channels water or other fluid in a radial flow pattern towards the wall of the filter container 240. FIGS. 11A and 11B show an alternative radial filter 1141 that channels water from the outer walls of the filter container 240 towards the longitudinal axis of the filter container 240. To change from a radial flow to a linear flow, a secondary adapter (cartridge) is used internally to direct the flow evenly from the bottom to the top or from the top to the bottom. An exemplary secondary adaptor is shown in FIGS. 12A-12C.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A disposable filter cartridge comprising:
    a first locking member;
    a second locking member;
    a filter cap including at least one partial flange configured to twist into a recess defined by an interference fit of the first locking member and the second locking member to secure the filter cap within the recess; and
    a filter container for receiving a filter therein, wherein the filter container is threadably coupled to the filter cap and includes a lock for retaining the filter container to the filter cap;
    wherein the first locking member comprises an inlet/outlet attachment including an inlet port and an outlet port extending therefrom, the inlet port configured to allow a flow of fluid into the filter and the outlet port configured to allow the flow of fluid out of the filter;
    wherein the outlet port is a centrally located port connected to a central channel in the filter cap to allow fluid to flow along a longitudinal axis of the filter;
    wherein the inlet port is offset from the centrally located port and fluidly connects to one or more other channels in the filter cap via a toroidal chamber formed between a bottom of the inlet/outlet attachment and an upper surface of the filter cap; and
    wherein the second locking member comprises a support bracket.

2. The disposable filter cartridge of claim 1, wherein at least one of the filter cap, first locking member, and second locking member includes an o-ring to form a water-tight seal between the filter and at least one fluid channel defined by the filter cap.

3. The disposable filter cartridge of claim 1, wherein the lock couples the filter container to the filter cap without adhesive and heat treatment.

4. The disposable filter cartridge of claim 1, wherein, when assembled together to form a locking assembly, the inlet/outlet attachment and support bracket define a recess bounded on one side by the lower edge of the inlet/outlet attachment and other side by a rim along an aperture in the support bracket.

5. The disposable filter cartridge of claim 1, wherein the support bracket comprises one or more twist-and-lock features protruding from an edge thereof wherein the twist-and-lock features define a guide path for an end of the filter cap.

6. The disposable filter cartridge of claim 5, comprising:
    a lock well at the end of each twist-and-lock feature, wherein the lock well engages a complementary feature on the filter cap to secure the filter cap to the support bracket.

7. The disposable filter cartridge of claim 6, wherein each twist-and-lock feature comprises a dislodge aid that facilitates removal of the filter cap from the recess.

8. The disposable filter cartridge of claim 1, further comprising cartridge positioning aids on at least one of the filter cap and the filter container to properly seat the filter in the filter container.

9. The disposable filter cartridge of claim 8, further comprising one or more water shut-off rims and one or more gaskets coupled together to separate and prevent incoming unfiltered water from mixing with and contaminating the filtered water exiting the filter.

10. The disposable filter cartridge of claim 1, wherein the lock on the filter container engages the filter cap to couple the filter container to the filter cap by screwing the filter container to the filter cap.

11. The disposable filter cartridge of claim 10, further comprising an o-ring received in a groove of the filter cap to create a watertight seal between the filter cap and the filter container once the filter cap is locked to the filter container.

12. The disposable filter of claim 1, wherein:
    the filter cap comprises a cylindrical shoulder that protrudes from a central region of the filter cap;
    a cylindrical plug extends from a central region of the cylindrical shoulder;

a cylindrical inner channel and one or more cylindrical outer channels run through the plug and shoulder, respectively, to the inside of the assembled disposable filter cartridge; and an inflow and outflow separating wall prevents fluid from spilling between the inner channel and the outer channel without flowing through filtration media in a body of the filter container.

13. The disposable filter cartridge of claim 12, wherein the filter cap comprises one or more partial flanges protruding from the shoulder, each partial flange comprising:
a mount shoulder,
a lodge aid, and
a second lock;
the mount shoulder, lodge aid and second lock each configured to mount and nest the filter cartridge.

14. The disposable filter cartridge of claim 13, wherein:
the filter cap and filter container are configured to be installed into the locking assembly by:
inserting the plug into the central aperture in the support bracket; and
twisting the filter container with respect to the locking assembly to cause the partial flanges to engage the twist-and-lock features along the recess defined by the assembled inlet/outlet attachment and the support bracket.

15. The disposable filter cartridge of claim 1, wherein the cartridge is configured such that fluid can travel in through the inlet port, along a linear flow path along the longitudinal axis of the filter container filled with filtration media, and along a return path along an outer edge of the filtration media to the outlet port.

16. The disposable filter cartridge of claim 1, wherein the cartridge is configured such that fluid can travel in through the inlet port, along a path along an outer edge of filtration media in the filter container, through the media, and to the outlet port along a linear return flow path along the longitudinal axis of the filter container.

* * * * *